United States Patent [19]
Taylor

[11] 4,098,438
[45] Jul. 4, 1978

[54] GASOLINE SPILL PREVENTION SYSTEM AND APPARATUSES

[76] Inventor: Loyd G. Taylor, Rte. 1, Box 3, Canyon, Tex. 79015

[21] Appl. No.: 644,487

[22] Filed: Dec. 29, 1975

[51] Int. Cl.² ............... F16L 35/00; F16L 37/28
[52] U.S. Cl. .................. 222/529; 137/68 R; 137/797; 251/149.1; 285/2
[58] Field of Search .......... 222/527, 529, 541; 251/149.1; 141/392; 137/797, 68 R; 285/2

[56] References Cited
U.S. PATENT DOCUMENTS

| | | | |
|---|---|---|---|
| 1,173,620 | 2/1916 | Thompson | 251/149.1 |
| 2,240,458 | 4/1941 | Grise´ | 222/529 X |
| 2,299,643 | 10/1942 | Moody | 251/149.1 |

Primary Examiner—Allen N. Knowles
Assistant Examiner—Frederick R. Handren
Attorney, Agent, or Firm—Ely Silverman

[57] ABSTRACT

In a system comprising a pump, a source of gasoline, a hose, and a cutoff valve and nozzle with the hose attached at a distant end to the nozzle and the central end to the pump, the improvement which comprises providing at the distant end of the hose, a rupturable self sealing unit; the sealing unit is converted by movement of the cutoff valve and nozzle as would otherwise tear the hose or damage the pump while reliably and automatically sealing the hose to prevent dangerous spillage of fuel such as gasoline on a service station roadway surface.

4 Claims, 19 Drawing Figures

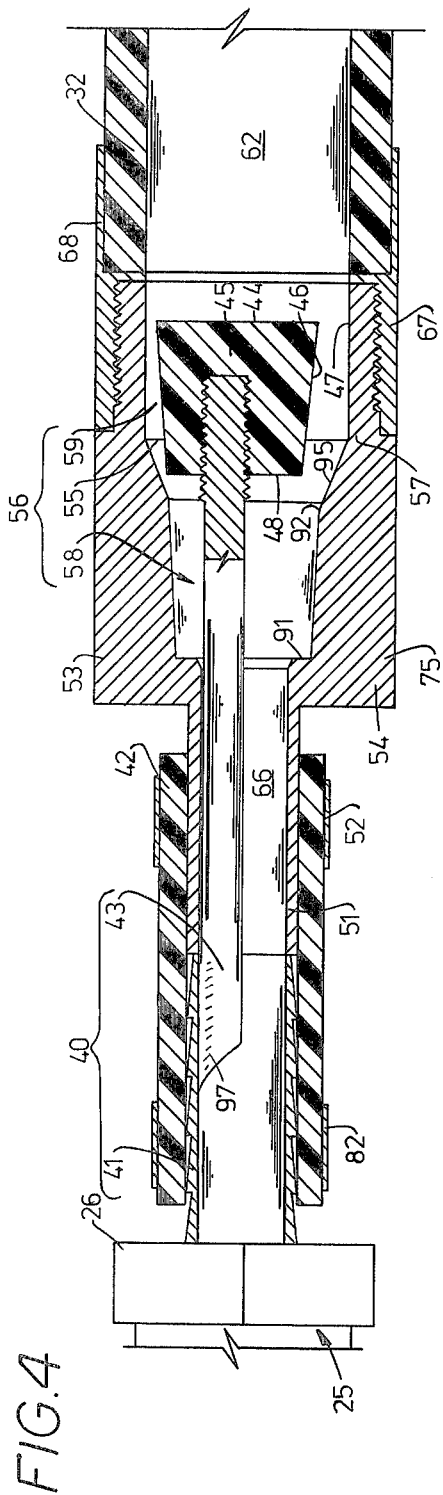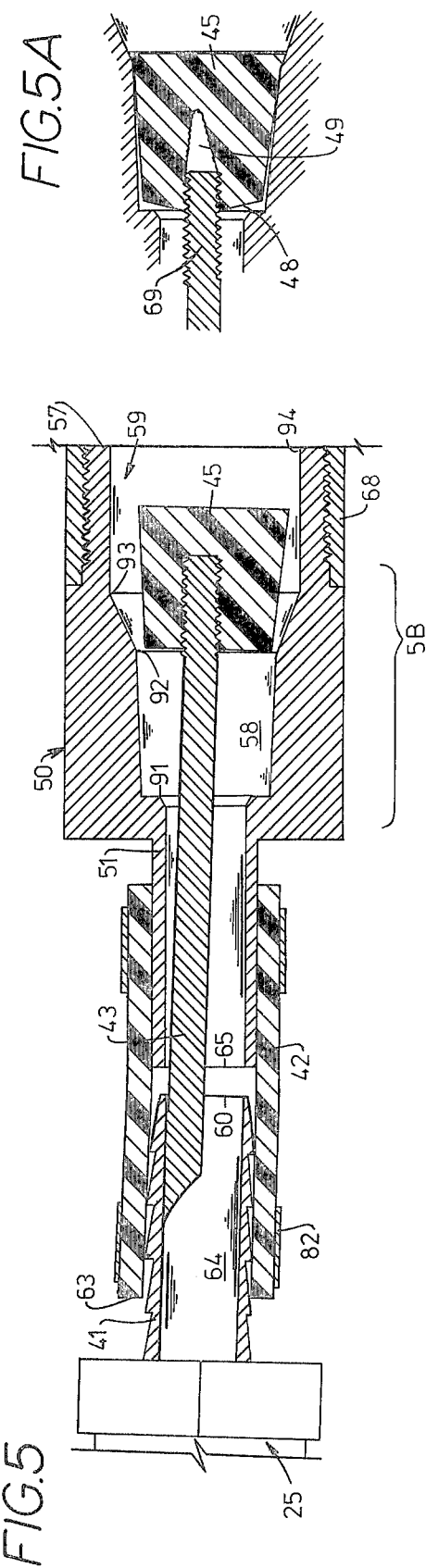

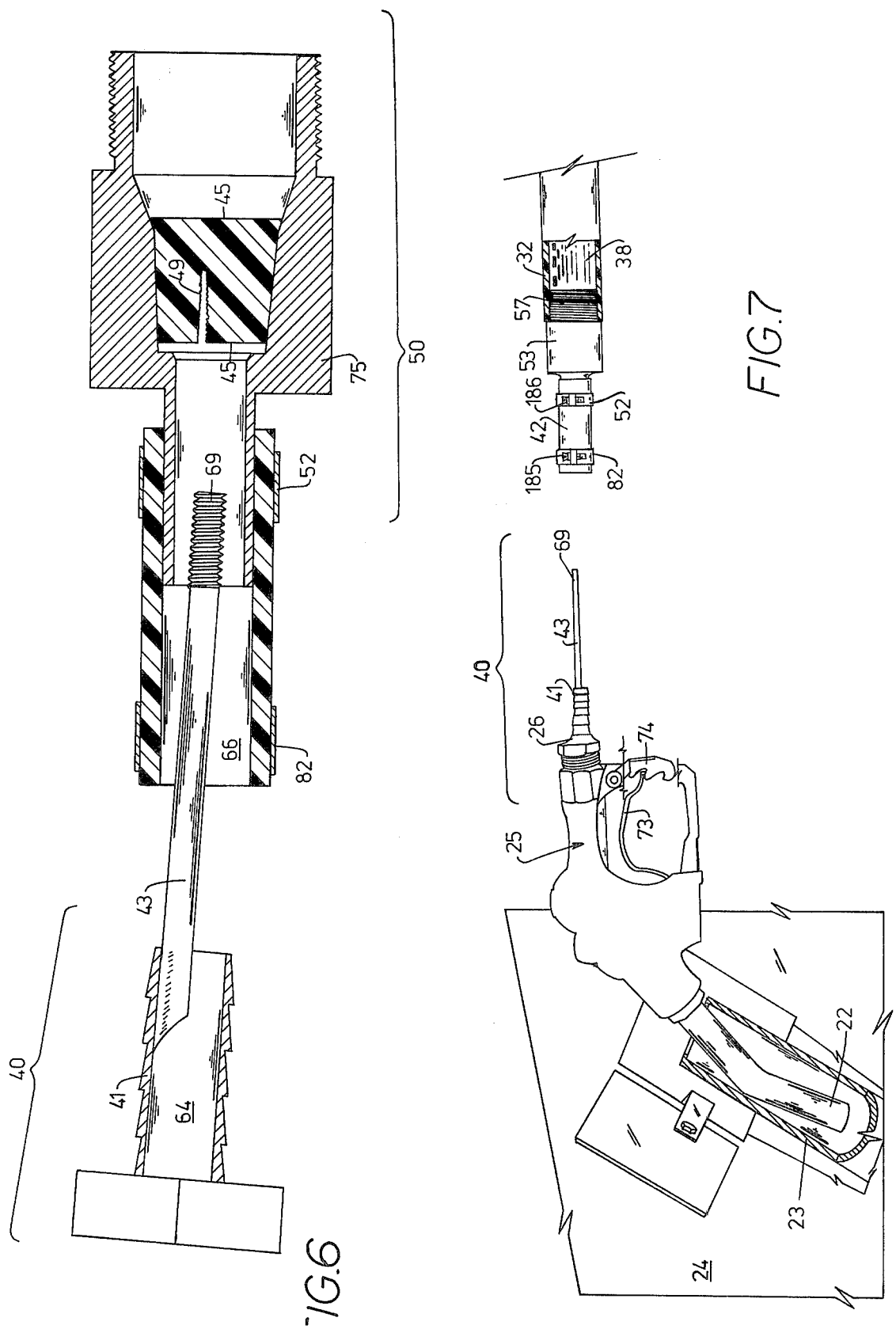

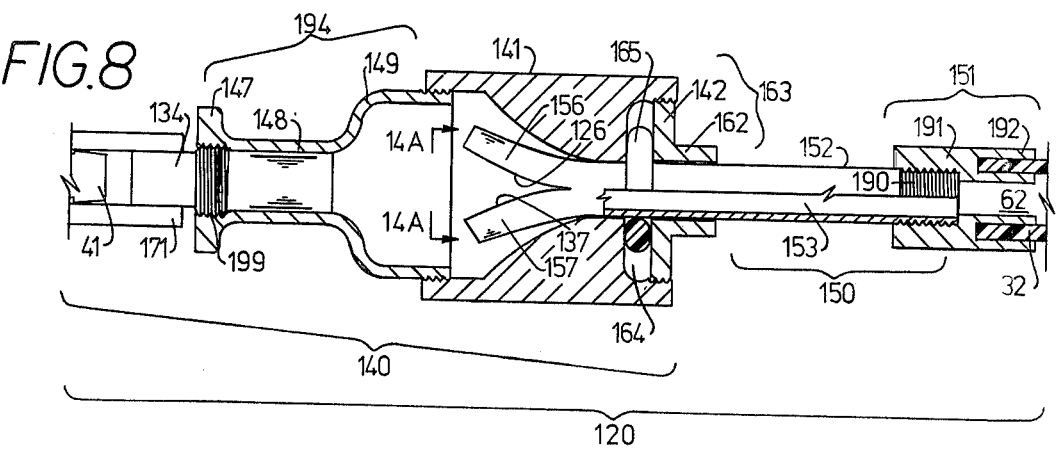
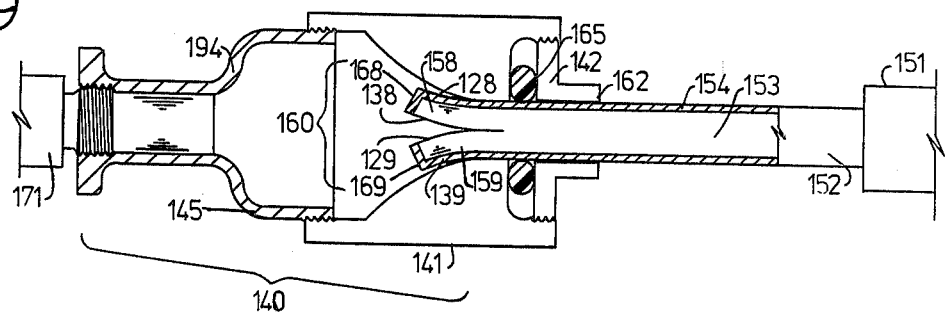
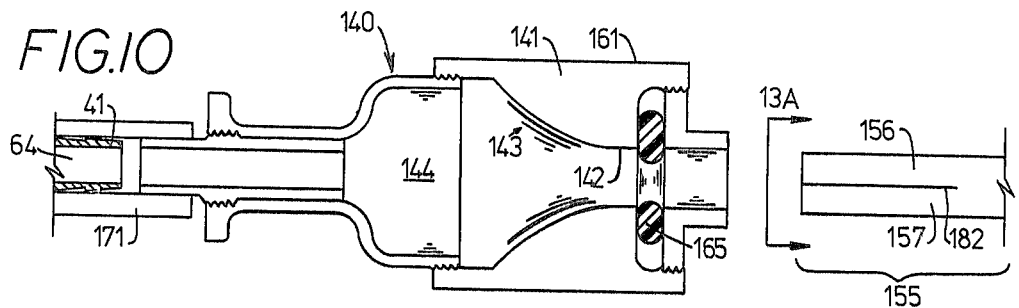
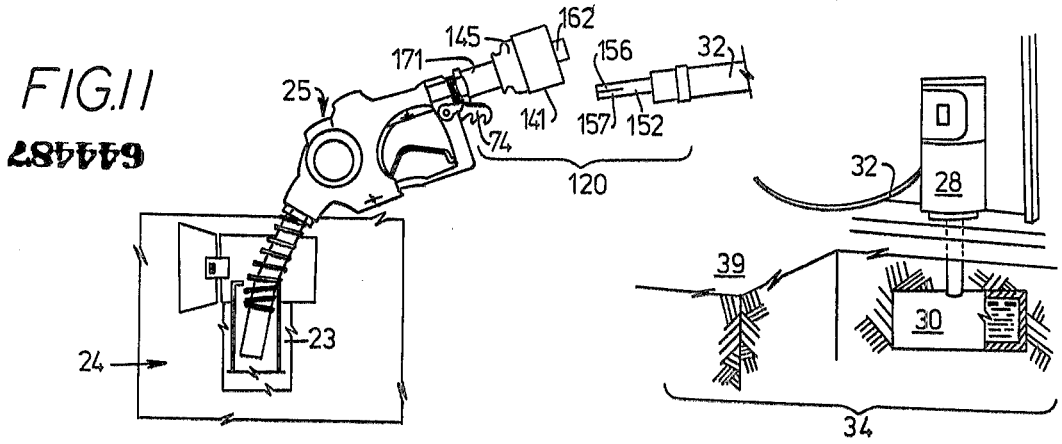

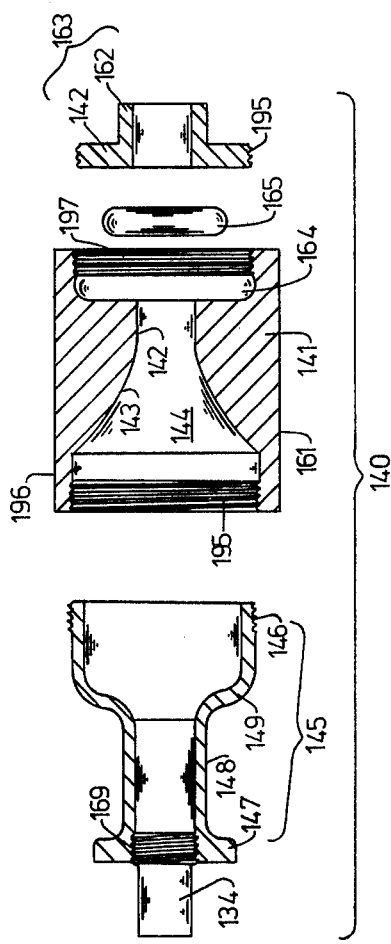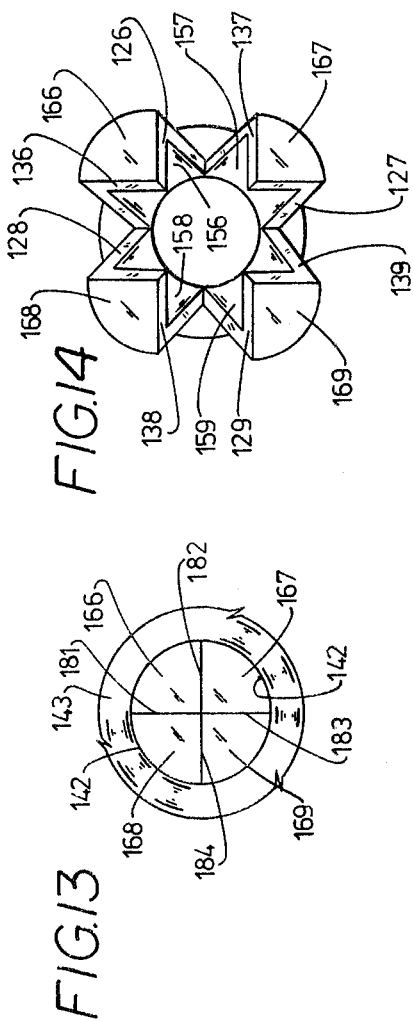

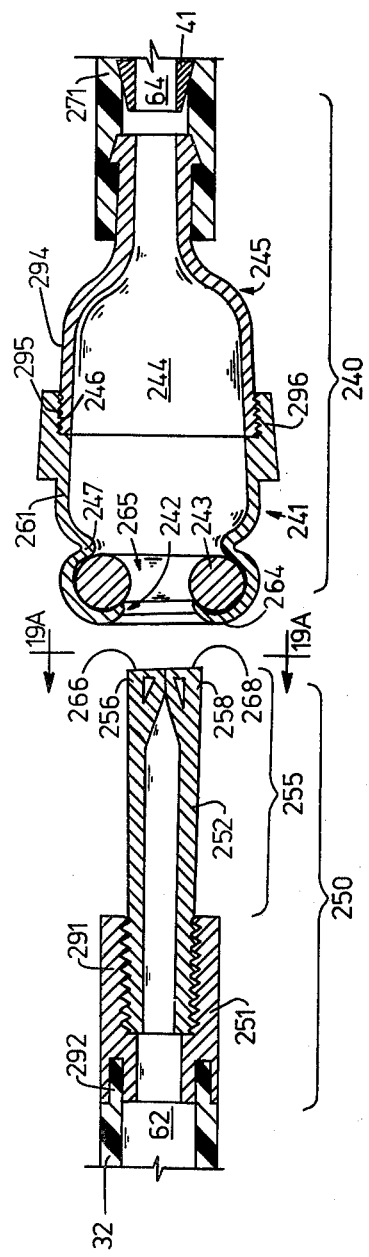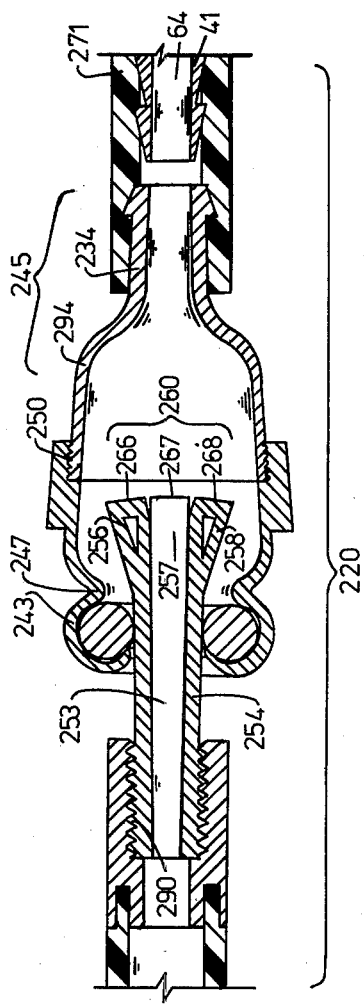

GASOLINE SPILL PREVENTION SYSTEM AND APPARATUSES

BACKGROUND OF THE INVENTION

1. Field of the Invention:

Liquid dispensing devices and closures.

2. Description of the Prior Art:

Self service gasoline stations are especially plagued by the gasoline spills resulting from customer's driving away from such service station while the gas hose from the gasoline pump is still connected to the customer's automobile. The result of such occurrence is that the hose is ruptured or the gasoline pump is damaged or both while gasoline is spilled on the roadway in large quantities before steps can be taken to stop the flow of fuel. Further, relations between that customer and the service station owner suffer and other customers are displeased or lost due to such damage to pump and dangerous roadway condition resulting from the gasoline spill.

The same type of spills and damage also result in conventional stations where attendents operate the pumps and vehicles are driven away from the gasoline station pump prior to removal of the gasoline pump hose nozzle from the vehicle gas tank inlet pipe. Notwithstanding available technology and commercial competition that gave rise to the self-service station this undesirable and dangerous situation remains unanswered until the present invention.

SUMMARY OF THE INVENTION

In order to provide a sealing unit that is converted by movement of a cutoff valve and nozzle as would otherwise tear the hose or damage the pump and so reliably and automatically seal the hose and prevent dangerous spillage of fuel such as gasoline on a service station roadway surface as well as prevent fuel loss in a system comprising a pump, a source of gasoline, a hose, and a cutoff valve and nozzle, there is provided in such system a fairly readily rupturable self sealing unit at the distant end of the hose. By this invention, several such sealing units are provided. Each of these several automatic sealing units comprises, in an operative combination, a proximal sealable unit and a distal seal actuating unit arranged to provide that the seal is formed prior to complete disconnection of those units and a fluid connection therebetween: the proximal sealable unit comprises a proximal hose attachment attached to the distal end of the hose and a support means for the closure element. The distal element comprises a distal connection to the nozzle and cut off valve assembly and a seal closing or forming unit which is actuated by distal movement of the nozzle and valve assembly from the hose and cooperates with the proximal sealable unit in forming a seal thereon.

BRIEF DESCRIPTION OF THE DRAWINGS

FIG. 4 is an enlarged scale longitudinal diametral sectional view in zone 4A of FIG. 3 and prior to the relationship of parts as shown in FIG. 5.

FIG. 5 is a scale longitudinal sectional view of the components shown in FIG. 4 in the array of such parts shown in an early stage intermediate between FIGS. 1 and 2 to show relations of those parts when beginning to be separated.

FIG. 5A is a view of parts in zone 5B of FIG. 5 at a stage intermediate between stages shown in FIGS. 5 and 6.

FIG. 6 is a longitudinal sectional view of parts shown in FIGS. 4 and 5 after initial separation of the subassemblies 40 and 50.

FIGS. 4, 5 and 6 are drawn to scale and are all at the same scale to illustrate quantitative relations between the parts shown.

FIG. 7 is a side view of zone 3A as in FIG. 3 following separation of the nozzle assembly 25 from the pipe 32 as in FIG. 2 FIGS. 3 and 7 are drawn to the same scale.

FIG. 8 is generally a diametral longitudinal sectional view of another embodiment of the invention 120 with its major units 140 and 150 in their joined array while connecting the nozzle assembly 25 and hose 32 generally as shown for assembly 20 in FIGS. 1 and 3.

FIG. 9 is a diametral longitudinal sectional view showing the subassemblies 140 and 150 of embodiment 120 generally as shown in FIG. 8 but in an intermediate stage of process of separation thereof. The view shows the tube 152 in diametral longitudinal section while FIG. 8 shows a side view of the distal end segments of tube 152 and a side view of the O-ring 165; FIG. 9 also shows a side view of hose 32 and connector 181 while such parts are shown in diametral section in FIG. 8.

FIG. 10 is a showing as in FIGS. 8 and 9 of the position of parts of subassemblies 140 and 150 of the embodiment 120 of FIG. 9 after separation of such subassemblies during operation of the embodiment 120.

FIG. 11 is a combined diagramatic view of station 34 of FIG. 1 and a side view of a zone as 3A of FIG. 1 generally as in FIG. 7 immediately following separation of (a) the nozzle assembly 25 and one portion of assembly 120 and (b) hose 32 and another portion of assembly 120 following movement of a car as 24 from a pump as 28 as shown in FIG. 2 when the apparatus 120 is used in place of apparatus 20 in a combination of parts as shown in FIGS. 1-3.

FIG. 12 is an exploded view of parts of embodiment shown in FIG. 8 exclusive of tube 152 prior to reassembly of the part thereof as in FIG. 8.

FIG. 13 is an end view along plane 13A—13A of FIG. 10.

FIG. 14 is an end view along plane 14A—14A of FIG. 8.

FIG. 15 is a showing of embodiment 220 in longitudinal diametral sectional view with separated portions of the components shown in FIG. 16 after an operation as in FIGS. 8–10.

FIG. 16 is an end view of unit 255 along plane 16A—16A of FIG. 15.

FIG. 17 shows in diametral longitudinal sectional view the elements of embodiment 220 in engaged position corresponding to showing in FIGS. 4 and 8.

FIG. 18 is a side view of closure unit 255 along direction of view 17A of FIG. 16.

FIG. 3 shows the valve and nozzle assembly 25 with trigger 73 in position to keep open the fluid flow through the valve thereof, when filling the fuel or gasoline tank of a car 24. FIG. 7 shows the handle guard of assembly 25 broken away to show the spring loaded latch 74 that holds the valve of assembly 25 open during normal operation. FIG. 11 shows the latch 74 released and trigger 73 in its position corresponding to the closed valve position of assembly 25.

DESCRIPTION OF THE EMBODIMENTS OF THE INVENTION

Figure 1:
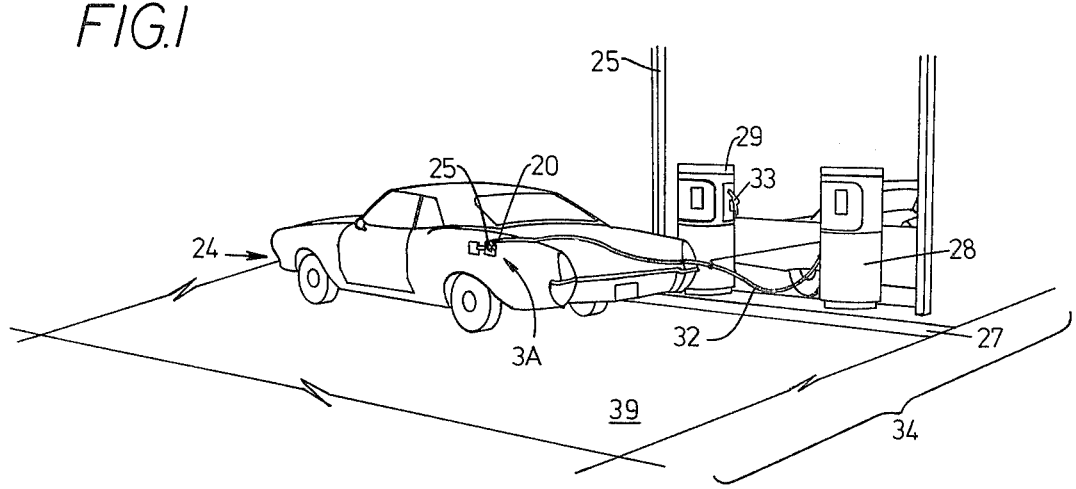
FIG. 1 is an overall view of the initial state of the system in which the apparatuses of this invention operate.

In the field of use of this invention, an automobile, 24, is driven up next to an automobile service station pump stand or island, 27, provided with gasoline pumps, 28 and 29, each of which pumps are operatively connected to and supplied by an underground fuel tank, 30. The conventional gasoline nozzle and cut-off valve assembly, 25, is used in conventional manner by an operator to locate the rigid cylindrical nozzle, 22, of such nozzle and valve assembly in the vertically extending gas tank inlet tube 23 of the car 24 when such car is located at a service station as 34 as shown in FIG. 1. When such car, 24, is located at the service station as 34, a flexible conventional fuel line hose 32 extends from its central end at one of the pumps as 28 to its distal end at the nozzle and valve assembly 25 at the gas tank inlet tube 22 of the car 24. The nozzle assembly as 25 is held in position by protusions, such as the spiral coil 35 on the nozzle 22 of the nozzle and valve assembly as 25 as well as the weight of the flexible hose or line 32.

Figure 2:
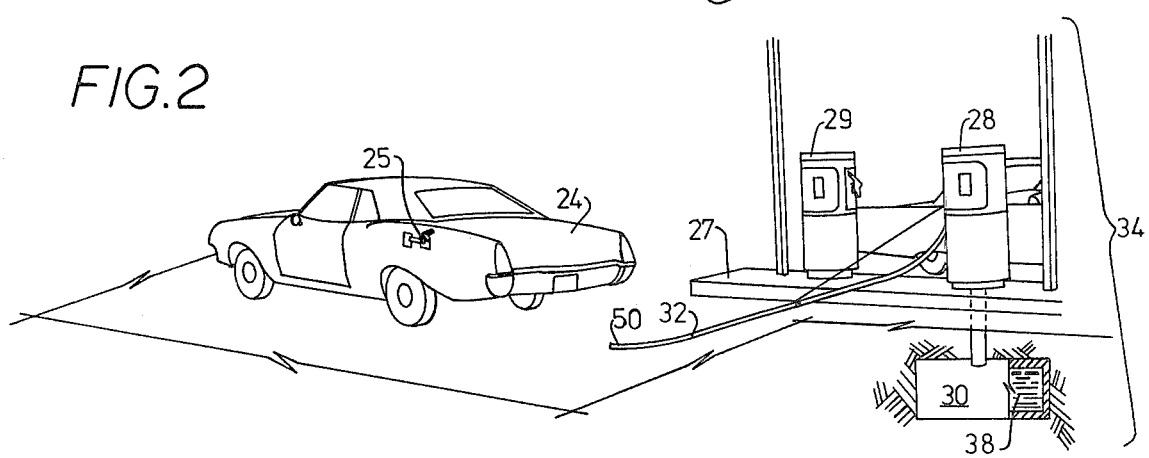
FIG. 2 is the terminal stage in the operation of the system in which the apparatuses of this invention operate.

The system and apparatus herebelow described are directed to prevention of substantial gasoline and diesel fuel spills. In the event that there is a failure to remove the nozzle and valve assembly as 25 from the gas inlet tube 23 and return such to its position on the pump 28 as is shown for the like nozzle and valve assembly on the pump 28 and the vehicle as 24 theretofore supplied with fuel as shown in FIG. 1 is driven away from the island 27 as shown in FIG. 2 while the valve and nozzle assembly 25 is still located in the gas tank inlet tube 23 (generally as shown in FIG. 2), usually there is a rupture of connection of the hose 32 and nozzle assembly 25 and a discharge of fuel through the open end of the hose and a resulting substantial gasoline spill and quite often a subsequent fire. The devices of this invention prevent such spills and disasters from happening.

More particularly, the overall combination of this invention is a system comprising a pump 28 as in FIG. 2, a tank as 30 which serves as a source of gasoline or the like fuel for internal combustion engine for an automobile as 24, a hose or flexible conduit 32 and a nozzle and cut-off valve assembly as 25 and, also, an automatic sealing unit as 20, 120, or 220 according to this invention.

DESCRIPTION OF EMBODIMENT OF FIGS. 3-7

The sealing unit 20 comprises a first or proximal subassembly 50 which is relatively close to the pump as 28 and a second or distal sub assembly 40 which is relatively close to the nozzle assembly 25. These first and second sub-assemblies as 40 and 50 are cooperatively yet separatably joined to form a liquid tight seal on the first or proximal unit whenever a vehicle as 24 drives away from the island 27 without prior removal of the terminal or distal nozzle and valve assembly as 25 from attachment to the vehicle or by holding of the nozzle and valve assembly in the gas tank inlet tube.

More particularly, each sealing assembly as 20 has a liquid conduit tube or hose or proximal portion as 50 which is sealable and which portion is firmly attached to the distal or distant end of the conduit or hose as 32 while the second or nozzle or distal unit as 40 which is the seal forming unit is firmly attached to the proximal end of the nozzle and valve assembly unit 25. "Proximal" as used herein means close or closer to the pump 28, while "distal" means more distant from the pump 28 along the length of the hose or conduit 32 toward nozzle assembly 25. On distal displacement or separation of the second or distal unit as 40 relative to the first or proximal unit as 50, a seal is formed by the second unit at the distal end of the conduit end 32 and prevents loss of liquid as 38 through the pump into the line 32 and onto the surface 39 of the station 34.

In the embodiment of the invention shown in FIGS. 3-7, the sealing unit 20 comprises a distal sub assembly 40 and a proximal subassembly 50 and an intermediate tube 42. The distal sub assembly comprises a rigid cylindrical inlet tube 41 firmly attached to a rear plate or base plate 26 of the nozzle and cut-off valve assembly 25 and an arm 43.

The proximal or sealing unit 50 is firmly attached to the distal end of hose 32 constantly. The connector tube 42 is a firm yet resilient imperforate sleeve. It is impermeable to gasoline. It may be made of rubber, a reinforced rubber or like plastic: it is attached with a gasline tight fit firmly to a end tube 51 of proximal unit 50: the distal end of tube 42 is releasably attached to the inlet tube 41 of distal unit 40 with a gasoline-tight fit.

As shown in FIGS. 3-7, one end of the hollow rigid nozzle inlet tube 41 is firmly attached to the base 26 of assembly 25 and the flexible connector tube 42 is connected to the other proximal end of the tube 41 and serves to releasably yet firmly connect the distal unit assembly 40 to the proximal assembly 50. The proximal or sealing assembly 50 comprises the connector tube 51 and a rigid body 53 firmly connected together. The tube 51 is clamped to the connector tube 42 and maintains a gasoline-tight connection between the nozzle and seal assembly 25 and the conduit 32 until the stopper 45 has been positioned to block the liquid connection from the interior 62 of the tube or hose 32 to the interior of tube 41.

The proximal or seal body 53 comprises a rigid cylindrical shoulder 54 and a rigid hollow cylindrical wall 75 and the sealing chamber 56 formed between wall 75 and shoulder 54. At its proximal end 47 (the end near to the hose 32 and the pump 28,) wall 75 is continuous with its threaded proximal seal connector portion 57. Such threaded portion 57 is connected to a female threaded portion 67 of a connector 68 which is firmly attached to the tube as 32 in a gasoline-tight manner.

The sealing chamber 56 has a front frustoconical slightly tapered and relatively narrow portion 58 and a rear enlarged frustoconical or substantially cylindrical portion 59 of greater diameter than the distal portion 58. An intermediate chamber portion 55 located between and continuous with portions 58 and 59 acts as a funnel or guide and has a milled frustoconical wall 95 that has a greater angle to the axis of the co-axial chambers 58 and 59 than do those chambers 58 and 59. Chambers 55, 58 and 59 and tube 51 and hose 32 are co-axial. In position of parts shown in FIGS. 4 and 1 and 3, tube 41 and 51 are co-axial.

A solid seal spacer arm 43 of small transverse cross-section relative to the transverse cross section of tube 41 is firmly connected at its distal end to the interior surface of a proximal portion of the rigid tube 41. The proximal end of the rigid spacer arm 43, which arm 43 is in the preferred embodiment, a rigid steel rod, is firmly yet releasably connected to a moveable seal element stopper 45 at its proximal end and serves to locate such seal stopper at a position so that the distal surface, 48, of such stopper 45 is, except at its edges, spaced away from the any of the edges and surfaces of the walls of the chambers 56, 58, and 59. The stopper 45 has a frustoconical shape: it is wider at its proximal end. Its proximal surface or end 44 is larger in diameter than its distal surface 48; each end (44 and 48) is a flat circular surface; a frustoconical surface 46 joins the cylindrical end faces 48 and 44. The surface 46 is, as shown in FIGS. 4 and 5, sufficiently well spaced away from the interior walls of the chamber 58, 59 and to provides for gas flow from the interior 62 of the tube 32 past such stopper into the passage way 66 of the tube 51. The distal edge 65 of the unit 50 and the proximal edge 60 of the tube 41 are adjacent to each other in the position of parts as shown in FIG. 4. The attachment of cork 45 to arm 43 is by a hole 49 that extends only partly through the stopper body.

The length of seal spacer arm 43 is chosen so that the length thereof provides for movement of the stopper 45 into its locked position as shown in FIG. 6 adjacent to the walls of the chambers 58 prior to movement of the edge 60 of the left end of tube wall 41 past the distal end 63 of tube 42 whereby gasoline or other fluid flow is maintained from chamber 62 of hose 32 through chamber 66 of tube 51 through chamber 64 of tube 41 until stopper 45 is firmly seated in its sealing position as shown in FIG. 6.

The proximal end of the arm 43 is located in an axially elongated hole 49 extending parallel to the central longitudinally axis of the frustoconical surface provided by the peripheral surface 46 of the cork 45.

Accordingly, as the car 24 drives away from the pump 28 with the sub assembly 25 locked in the tube 23 of the gas tank the tube 41 with the spacer arm 43 attached thereto moves away from the seal assembly 50 which (50) is firmly attached to the end of the tube or hose 32. The force providing of such motion of parts 40 and 50 (the movement of car 24 attached to nozzle assembly 25) provides for a disconnection of the intermediate connector tube 43 from the tube 41. Such release or disconnection provides a relief or break point. The motion of the sub assembly 40 leftward as shown in FIGS. 4,5,6 and away from the seal sub assembly 50 moves the frustoconical cork 45 leftwards as shown in FIGS. 4,5, and 6 so that the walls 46 move into contact with the wall of the chamber 58 and the form a firm liquid tight seal therewith.

Figure 3:
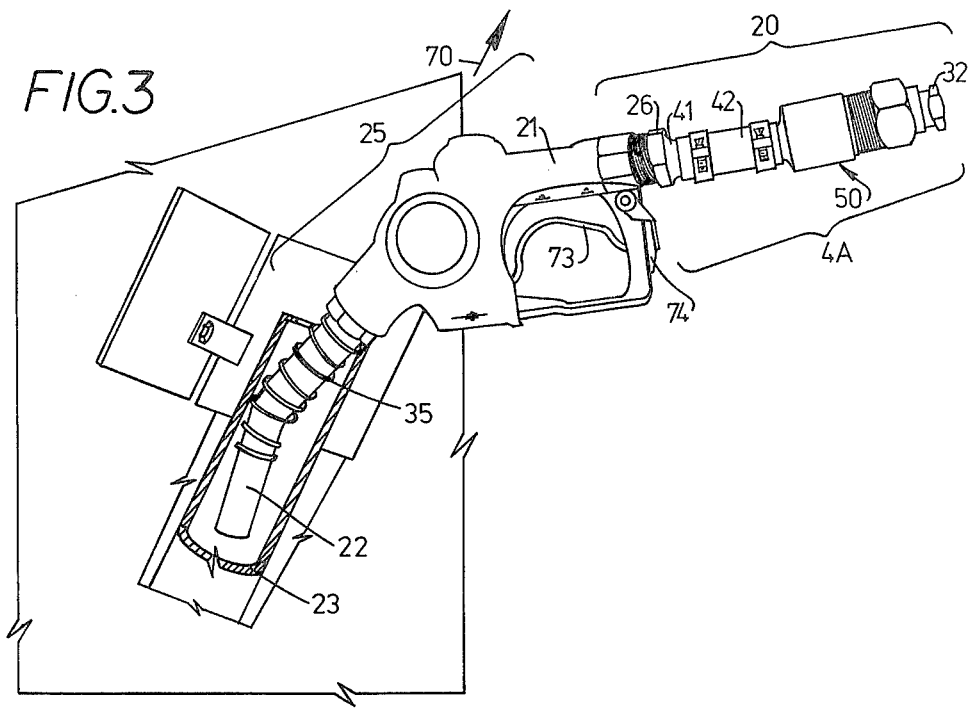
FIG. 3 is a side view of the dispensing nozzle and release assembly 25 and assembly 20 in zone 3A of FIG. 1.

The hole 49 is straight and somewhat wider at the distal stopper body surface 48 than it is closer to the stopper body proximal surface 45. Accordingly, the leftward (as shown in FIGS. 3–7) movement of the proximal end 69 of the rod 43 and the connection thereof to the hole 49 deforms and narrows the cork at its distal end 48 while (as shown in FIG. 5A) arm end 69 is pulling on the cork. The proximal portion outer surface 46 of the stopper 45 engages the proximal end of wall of chamber 58 shown in FIG. 5A, however, once the end 59 has lost its connection with the hole 40 as shown in FIG. 6 the distal end of body 45 expands somewhat and forms a firm yet resilient grip with a gas tight fit with the adjacent portions of the wall of the chamber 58 i.e. it expands and forms a seal that is only disrupted by a force of about 10–20 pounds in the proximal direction once the stopper has achieved its sealing location as shown in FIG. 6. Accordingly, through such extremely firm as well as resilient locking of the seal element 45 in the chamber 56, even when the assembly 50 falls to the ground as shown in FIG. 2, there is no dislodgement or passage of fluid whatsoever from the interior chamber 62 of the hose or tube 32 past such stopper 45, which might, otherwise, create a hazard or fire. The wall of the unit 50 is made of (a) copper or is (b) steel with a firm adhering coating of galvanized coating or rubber attached thereto so when the hose 32 with the proximal end assembly 50 attached thereto, and with an internal structure as shown in FIGS. 6 and 7 strikes the ground as shown in FIG. 2, no sparks result as might provide for fire near a spill of gasoline. The vertical direction is shown by arrow 70 in FIGS. 3 and 7 to show the orientation of such figure without relying on any diagrammatic approximation. The structure of apparatus 20 provides that gasoline from the chamber 58 passes to the sub assembly 25 prior to the filling of the chamber 58 by the cork 45. Accordingly, all liquid passes from chamber 58 through the channel 66 in tube 51 and through the channel 64 in the tube 41 into the sub assembly 25 prior to completion of location of the stopper 45 in chamber 58 and such gasoline passes down the conduit 23 and into the gas tank of the vehicle 24 in which the nozzle 22 is placed as shown in FIG. 3 when the valve of assembly 25 is open. Thereby any gasoline left in the tube 41 when separation of assemblies 40 and 50 of the unit 20 is imminent passes downward through the tube 22 to the tank of the vehicle 24 and does not pass to the ground to form a puddle when the subassemblies 40 and 50 are parted as shown in FIGS. 2 and 7 when the valve in assembly 25 is open to pass gasoline from inlet tube 41 to nozzle 22. When the valve of valve assembly is closed, the gasoline above such valve may spill on the roadway or surface 39. However, as the impact of the subassembly 50 on the roadway 30 cannot provide sparks such minor spill of gasoline poses no substantial fire hazard.

Arm 43 is dimensionally stable and substantially rigid and threaded at its proximal end 69 so that it firmly yet releasably locates the stopper 45 at a predetermined position as shown in FIGS. 4 and 5; however it is sufficiently resilient to withstand dropping on concrete pavement as on the usual roadway or surface 39 of a station as 34.

In the sealed position of apparatus 20 as shown in FIG. 6, the pressure of the liquid in hose 32 helps keep the stopper 45 in position.

The force required to separate subassemblies 40 and 50 is adjustable by the adjustment of clamp 82. Clamp 82 is an adjustable clamp and provides for the adjustment of the amount of tension or grip of the sleeve 42 on the tube 41 and is adjusted to provide that the subassembly 40 will be separated from the subassembly 50 when the tension along hose 32 becomes so great that damage to the hose and/or the pump 28 would result unless relief of such stress were provided. Usually such stress develops when a car being serviced, as 24, begins to drive away from the service island as 27 with the nozzle and cut-off valve assembly 25 carried thereby in its gas tank inlet tube as above described.

After use of the assembly 20 it is reset for use again by disconnecting the threaded connection between hose connector 68 and the threaded connection 67 at the threaded portion 57 of the wall 75. The cork 45 is then pressed (proximally) out of its sealing position in the chamber 58, which sealing position is shown in FIG. 6. This requires a force of about 15 pounds (usually 10 to 20). Clamp 82 is then loosened so that hose 42 may then be placed on tube 41 and the hose 42 is then repositioned onto tube 41 as in FIG. 4 and the clamp 82 is then tightened. The stopper 45 is then replaced on the arm 43 in a position as shown in FIG. 6. The connector 68 is then again firmly yet releasably connected in a gas tight manner to the connector wall portion 57 of the wall 75.

Table I herebelow provides dimensions of a preferred embodiment of apparatus 20.

DESCRIPTION OF EMBODIMENT OF FIGS. 8–14

The automatic sealing unit 120 is, like embodiment 20 above described, directed for use in the system comprising the pump as 28, the hose as 32, and the cutoff valve and nozzle assembly as 25 for use in the system shown in FIGS. 1 and 2 and above described [at page 6, line 2, to page 8, line 15].

Unit 120 comprises a proximal sealing assembly 150 and a distal seal forming or seal actuating sub assembly 140. The proximal sealing sub assembly 150 comprises a proximal hose attachment 151 and a closure forming unit 155.

The closure forming unit 155 is an axially symmetrical structure: it comprises a proximal cylindrical tube portion 152 and a distal radially expanded portion 160. The tube portion 152 has a cylindrical wall 154 of uniform thickness that surrounds a cylindrical passage 153. Passage 153 is open at its proximal and distal ends. The proximal end of tube 152 has external threads 190.

The distal radially expanded portion 160 comprises an axially symmetrical series of identically sized and shaped deformed cylindrical segments 156, 157, 158, and 159. Each of the segments 156–159 has a terminal distal centrally extending seal segment attached thereto 166, 167, 168 and 169 respectively as shown in FIGS. 8 and 9. The terminal seal segments 166–169 are equal portions of an imperforate circular plate as shown in FIGS. 13–14. Each of the incremental portions of segments 156–159 increase in radial extension as their locations extend distally, that is, they are spread outward and distally as shown in FIGS. 8 and 9 and 14. Each of the segments 156, 157, 158 and 159 have longitudinally extending edges, edges 126 and 136 for segment 156, edges 127 and 137 for segment 157, edges 128 and 138 for segment 158, and edges 129 and 139 for segment 159 as shown in FIGS. 8 and 9 and 14. The wall 154 is continuous at its distal end with the proximal portions of the segments 156–159. The hose attachment sub assembly 151 comprises a female threaded sleeve 191 and a cylindrical clamp 192 attached to the proximal end thereof. The clamp 192 is firmly and permanently attached to the distal end of the hose 32.

The threads 190 of tube 152 form a gasoline tight yet releasable connection with female threads of sleeve 191.

The distal sub assembly 140 comprises a rigid proximal hollow rigid shaping body 141 and a rigid support body 145 releasably yet firmly joined together at external proximal threads 146 on body 145 and matching female threads 195 on shaping body 141.

The shaping body 141 is a longitudinally extending axially symmetrical hollow rigid body of circular transverse cross-section with an outer cylindrical surface 161 and a funnel shaped interior surface 143. Surface 143 is curved convexly centrally as shown in FIGS. 8–10 and has a wide threaded cylindrical distal end 196 and a narrow smooth proximal narrow neck 142. A proximal circular O-ring chamber 164 is provided to adjustably seat a deformable O-ring 164 as shown in FIGS. 8–10 and 12. An O-ring holder 163 is formed of a flat rigid threaded plate 142 and a rigid hexagonal collar or nut 162. The plate 142 is externally threaded at 198 for firm yet adjustable joining to the female threads 197 at the proximal end of body 141. The plate 142 holds the O-ring 165 in chamber 164 and forms a gasoline-tight seal between the outside of the tube 152 and the interior chamber 144 of body 141, because, as shown in FIG. 10, the seal 165, in the absence of the tube 152, resiliently expands into the space occupied by such tube walls in position of parts shown in FIGS. 8 and 9.

The support body 145 comprises a hollow rigid axially symmetrical bell 194 and the firmly joined thereto rigid threaded distal connector tube 134. Bell 194 comprises a series of firmly joined rigid cylindrical structures 147, 148, and 149 as shown in FIGS. 8–10 and 12. A rigid circular plate 147 has an internal threaded connection 199 for engagement with external threads of the tube 134. The rigid tube 134 has proximal matching threads that connect to the threads of collar 147.

The external surface of tube 134 is firmly connected with a gasoline-tight fit to the distal portion of the flexible hose 171. Hose 171 connects at its distal end to the external surface of the proximal tube 41 of the nozzle and cut off valve assembly 25 firmly and with gasoline-tight fit.

The threaded connection of tube 134 to the threads 199 of plate 174 accordingly serves to connect the valve and nozzle assembly 25 to the sub assembly 140. The plate 147 is firmly attached to a rigid cylindrical tube 148 which in turn connects to a threaded wide connector ring 149. External threads 146 on ring 149 serve to releasably yet firmly connect in a gas tight manner to threads in distal portion 196 of body 141. The forming body 141 and support member 145 surround a forming chamber 144 within which the radially expanded segments as 156, 157, 158, and 159 of closure forming unit 155 are located as shown in FIG. 8. The structure of embodiment 120 is directed to provide that the O-ring holder 163 firmly grasps the O-ring 165 which in turn firmly grasps the tube 152 to which the segments 156–59 are firmly attached and firmly yet yieldably locates those radially expanded segments in chamber 144 (distal of surface 143 of body 141 and provides a gasoline-tight connection from the interior 62 of the hose 32 to the interior channel 64 of the tube 41 of the nozzle and valve sub assembly 25. The arrangement of the bodies 141 and 145 of assembly 140 provides no reduction in transverse cross sectional area of flow from the channel 62 in the hose 32 to channel 64 of the inlet tube 41 of the nozzle and valve assembly 25.

In operation the plate 142 holds the O-ring 165 against the outer wall of tube 152 with a substantial yet adjustable degree of firmness dependent on the torque applied to the hexagonal nut 162 of the O-ring holder 163 so that when the force across the unit 120 in an assembly such as pump 28, hose 32, unit 120 and nozzle and valve assembly 25 in a series as in FIG. 11 and connected as in FIG. 1 (but with assembly 120 substituted for assembly 20,) due to a car as 24 leaving the island as 27 while the assembly 25 is still fixed to the tank inlet tube thereof as 23 exceeds the force of holding of tube 152 by the O-ring 165, assembly 25 moves leftward as shown in FIGS. 8–11 and hose 32 is relatively fixed in position, the assembly 140 moves distally and leftwardly as shown in FIGS. 8–11 of the chamber 144;

the segments 156, 157, 158, and 159 of tube 152 then contact the curved portion 143 of the interior wall of the shaping body 141 as shown in FIG. 9 and are pressed together by that wall 143 until the segments 156–159 form a substantially gasoline tight wall generally as shown in FIGS. 10 and 13. At the conclusion of such forming step, edges 126 & 137 form a gasoline tight seam 182, edges 127 and 139 form similarly tight seam 183, edges 129 and 138 form a gasoline tight seam 184 and edges 128 and 136 form a gasoline tight seam 181. Seals 181, 182, 183, and 184 are gasoline tight and the edges forming those seams have a coating of rubber to insure that the contact therebetween is a gasoline tight contact when arrayed as shown in FIGS. 10 and 13.

The structure of apparatus 120 provides that the liquid flow through conduit 32 toward nozzle 25 is cut off by the seal formed by the segments 166–169 and segments 156–159 prior to the withdrawal of the tube 152 from the body 141 and the gasoline tight seal formed by O-ring 165 and the tube 152.

The force of attachment of ring 165 to tube 152 is adjusted so that the subassemblies 140 and 150 are separated (and the closure unit 155 brought to its sealing condition) before the stress across unit 120 and along hose 32 might damage such hose or the pump 28 or any connection therebetween, but the force of attachment of ring 165 to tube 152 provides dimensional stability during usual use of the overall assembly of pump 28, hose 32, assembly 25 and assembly 120: any liquid then remaining in the chamber 144 after disconnection of sub assemblies 140 and 150 as above described passes downwards through assembly 25 if valve of assembly 25 is open after as well as while tube 152 and segments 156–159 are brought to their narrowed conditions as shown in FIGS. 10 and 13 and subassemblies 140 and 150 separated as shown in FIGS. 11 and 2. The material e.g. copper or aluminum, of which closure unit 155 and clamp 151 is made does not produce sparks of striking concrete so the small spill that may result if valve of assembly 25 is closed at the time of separation of components of assembly 120 is not dangerous.

For re-use of the assembly 120 after the closure assembly 155 is brought to its closed position as shown in FIGS. 10 and 11 and 13, the closed unit 155 is removed from connector 191 and the tube portion 152 of a new closure unit 155 is passed from chamber 144 of the disassembled (as in FIG. 12) distal assembly 140 through neck 142 and ring 165 and collar 162 and the threads 190 of the new tube 152 portion are connected to threads of the connector 191; the portion 149 and 196 of assembly 120 are then screwed together and the O-ring holder 163 then tightened to produce the array as in FIG. 8.

DESCRIPTION OF EMBODIMENT OF FIGS. 15–18

The automatic sealing unit 220 is, like embodiment 20 and 120 above described, directed for use in the system comprising a fuel source as 30, a pump as 28, a hose as 32, a cutoff valve and nozzle assembly as 25 for use in a system shown in FIGS. 1 and 2 and above described [at page 6, line 2, to page 8, line 15].

Unit 220 comprises a proximal sealing assembly 250 and a distal seal forming or seal actuating sub-assembly 240. The proximal sealing sub-assembly 250 comprises a proximal hose attachment 251 and a closure forming unit 255.

The closure forming unit 255 is an axially symmetrical structure: it comprises a proximal cylindrical tube portion 252 and a distal radially expanded portion 260. The tube portion 252 has a cylindrical wall 254 of uniform thickness that surrounds a cylindrical passage 253. Passage 253 is open at its proximal and distal ends. The proximal end of tube 252 has external threads 290.

The distal radially expanded portion 260 comprises an axially symmetrical series of identically sized and shaped deformed cylindrical segments 256, 257, 258, and 259. Each of the segments 256–259 has a terminal distal centrally extending seal segment firmly attached thereto 266, 267, 268, and 269 respectively as shown in FIGS. 16 and 17. The terminal seal segments 266–269 are equal angular portions of an imperforate circular plate as shown in FIG. 16. Each of the incremental portions of segments 256–259 increase in radial extension as their location extend distally, that is, they are spread outward and distally as shown in FIG. 17 when in their initial, non-sealing condition. Each of the segments 256, 257, 258 and 259 have longitudinally extending edges, like edges 126 and 136 for segment 156, edges 127 and 137 for segment 157, edges 128 and 138 for segment 158, and edges 129 and 139 for segment 159 as shown in FIGS. 8 and 9 and 14. The wall 254 is continuous at its distal end with the proximal portions of the segments 256–259.

The hose attachment sub assembly 251 comprises a female threaded sleeve 291 and a cylindrical clamp 292 attached to the proximal end thereof. The clamp 292 is firmly and permanently attached to the distal end of the hose 32. The external threads 290 of tube 252 form a gasoline tight yet releasable connection with female threads of sleeve 291.

The distal sub assembly 240 comprises a rigid proximal hollow rigid shaping body 241 and a rigid support body 245 releasably yet firmly joined together at external proximal threads 246 on body 245 and matching female threads 295 on shaping body 241.

The shaping body 241 is a longitudinally extending axially symmetrical hollow rigid body of circular transverse cross-section with an outer cylindrical surface 261, a ring seat 264 and a rigid toroidal ring 243. Ring 243 has a centrally convexly curved surface as shown in FIGS. 15 and 17. Body 241 has a wide threaded cylindrical distal end 296 and a narrow smooth proximal narrow inlet or neck at ring 242. A proximal rigid circular O-ring seat 264 firmly supports and seats O-ring 243 at its proximal end as shown in FIG. 15 and has a circular orifice 265 co-axial with ring 243 and wider than the hole in the ring 243. Body 241 is crimped or narrowed at a crimp or collar 247 to firmly hold the ring 243 in position.

The support body 245 comprises a hollow rigid axially symmetrical bell 294 and a rigid distal connector tube 234.

The external surface of tube 234 is firmly connected with a gasoline-tight fit to the distal portion of the flexible hose 271. Hose 271 connects at its distal end to the external surface of the proximal tube 41 of the nozzle and cutoff valve assembly 25.

The tube 234 connects the valve and nozzle assembly 25 to the sub assembly 240. A threaded wide portion 294 of body 245 has external threads 246 to releasably yet firmly connect in a gasoline-tight manner to threads 295 on distal portion 296 of body 241. The forming body 241 and support member 245 surround a forming chamber 244. The radially expanded segments as 256, 257, 258, and 259 of closure forming unit 255 are initially located in array as in FIG. 1 as shown in FIG. 17. The structure of embodiment 220 provides that the O-ring 243 firmly grasps the tube 252 to which the segments 256-259 are firmly attached and firmly yet yieldably locates those radially expanded segments in chamber 244 distal of surface of the ring 243 and provides a gasoline-tight connection from the interior 62 of the hose 32 to the interior channel 64 of the inlet tube 41 of the nozzle and valve assembly 25.

In operation the seat 264 holds the O-ring 243 against the outer cylindrical wall 254 of tube 252 with a limited (yet substantial and adequate) degree of firmness so that when the force across the unit 220 in an assembly such as pump 28, hose 32, unit 220 and nozzle and valve assembly 25 in a series as in FIG. 3 and connected as in FIG. 1 (but with assembly 220 substituted for assembly 20), due to a car as 24 leaving the island as 27 while the assembly 25 is still fixed to the tank inlet tube thereof as 23 exceeds the force of holding of tube 252 by the O-ring 243, assembly 25 moves rightward as shown in FIGS. 15 and 17 while hose 32 is relatively fixed in position, the assembly 240 tube moves outwardly and rightwardly as shown in FIGS. 15 and 17 of the chamber 144; the segments 256, 257, 258, and 259 of tube 252 then contact the curved surface of the circularly cross-sectioned shaping ring 243 and are pressed together by that ring until the segments 256-259 form a substantially gasoline-tight cylindrical wall and circular end generally as shown in FIGS. 16 and 18. At the conclusion of such forming step, the edges of segments 256-259 form gasoline-tight seams 281-284 (like 181-184 above described.) Seams 281-284 are gasoline-tight and the edges forming those seams may have a coating of rubber to insure that the contact therebetween is a gasoline-tight contact when arrayed as shown in FIGS. 16 and 18.

The structure of apparatus 220 provides that the liquid flow through conduit 32 toward nozzle 25 is cut off by the seal formed by the segments 266-269 and segments 256-259 prior to completion of the withdrawal of the tube 252 from the body 241.

The force of attachment of ring 243 to tube 252 is adjusted so that the subassemblies 240 and 250 are separated (and the closure unit 255 brought to its sealing condition) before the stress across unit 220 and along hose 32 might damage such hose or the pump 28 or any connection therebetween, but the force of attachment of ring 242 to tube 252 is substantial and adequate to provide dimensional stability during usual use of the overall assembly of pump 28, hose 32, assembly 25 and assembly 220.

Any liquid remaining in the chamber 244 after disconnection of sub assemblies 240 and 250 as above described passes downwards through assembly 25 if valve of assembly 25 is open after as well as while tube 252 and segments 256-259 are brought to their narrowed conditions as shown in FIGS. 15, 16, and 18 and separated as shown in FIGS. 15 and 2. The material e.g. copper or aluminum of which closure unit 255 is made, does not produce sparks on striking concrete so the small spill that may result if valve of assembly 25 is closed at time of separation of components of assembly 220 is not dangerous.

For re-use of the assembly 220 after the closure assembly 255 is brought to its closed position as shown in FIGS. 15 and 16 and 18, the closed unit 255 is removed from connector 291 and the tube portion 252 of a new closure unit 255 is passed from chamber 244 of the diassembled distal assembly 240 through the orifice 242 of ring 243 and the threads 290 of the new tube 252 portion are connected to threads of the connector 291; the portions 294 and 261 of assembly 220 are then screwed together to produce the array of parts as shown in FIG. 16.

TABLE I
Dimensions of Embodiment 20*
(These Supplement Relations Shown in FIGS. 1-7)

|  |  | Inches | Centimeters |
|---|---|---|---|
| Tube 42 | Length | - 3" | 7.6 cm |
|  | O.D. | - 1-3/16" | 3.0 cm |
|  | I.D. | - 3/4" | 1.9 cm |
| Sleeves 41 and 51 | Length | - 1-5/8" | 4.2 cm |
|  | O.D. | - 3/4" | 1.9 cm |
|  | I.D. | - 9/16" | 1.4 cm |
| Arm 43 (Edge 60 to End 69) | Length | - 3-3/4" | 9.6 cm |
|  | O.D. | - 1/4" | .6 cm |
|  | 20 th/inch |  | 20 th/2.5 cm |
| Body 75 | O.D. | - 1-31/32" | 5.0 cm |
|  | Total Length | - 2-3/4" | 7.0 cm |
|  | Length, (portion 57) | - 7/8" | 2.2 cm |
| Chamber 59 | I.D. at points 93 & 94 | - 1-9/16" | 4.0 cm |
|  | Depth (94 to 93) | - 1" | 2.5 cm |
| Chamber 55 | Diameter max.(at 92) | - 1-7/16" | 3.7 cm |
|  | Diameter min.(at 91) | - 1" | 2.5 cm |
|  | Length (93-92) | - 7/16" | 1.1 cm |
| Chamber 58 | Diameter max.(at 92) | - 1" | 2.5 cm |
|  | Diameter min.(at 91) | - 7/8" | 2.2 cm |
|  | Length (91-92) | - 1" | 2.5 cm |
| Chamber 56 | Depth Chamber 59 + 55 + 58 to inside of shoulder 54 (points 91-94) | - 2-7/16" | 6.2 cm |
| Stopper 45 | Diameter face 44 | - 1-1/16" | 2.7 cm |
|  | Diameter face 48 | - 15/16" | 2.4 cm |
|  | Length (48-44) | - 1" | 2.5 cm |
| Hole 49 | Diameter | - 1/8"[uniform±1/32] | .3 cm |
|  | Length | - 1/2" | 1.3 cm |

*min. = minimum
max. = maximum
th. = threads
I.D. = internal diameter
O.D.. = outside diameter

I claim:

1. A fluid fuel dispensing system comprising, in operative combination:
   a. a container for fuel;
   b. a pump with an inlet operatively connected to said container and a pump outlet;
   c. an elongated flexible conduit having a proximal end connected to said pump outlet and another distal end;
   d. a nozzle assembly comprising a proximal inlet and a distal outlet; and,
   e. an automatic sealing unit one, proximal, end of which is connected to said distal end of said conduit and another, distal, end of which is connected to the proximal end of said nozzle assembly and wherein the automatic sealing unit comprises, in operative combination, a proximal sealable conduit unit and a distal seal actuating unit and connector, the proximal sealable unit comprising a proximal conduit attachment attached to the distal end of the conduit and a sealing chamber, the distal seal actuating unit and connector comprising a rigid cylindrical inlet tube firmly attached at its distal end to the nozzle assembly and a seal closing means actuated by distal movement of the nozzle assembly from the conduit, and wherein the nozzle assembly includes between the inlet and outlet thereof a cut-off valve, and wherein said proximal sealable unit is firmly attached to the distal end of said flexible conduit, and the proximal end of an intermediate connector tube comprising a firm imperforate sleeve is attached with a gasoline-tight fit firmly to one end of the proximal sealable unit and the distal end of said connector tube is releasably attached to the proximal end of the distal seal actuating unit with a gasoline-tight fit and releasably yet firmly connects the distal unit to the proximal sealable unit, and the proximal sealable unit comprises a rigid cylindrical shoulder and a rigid hollow cylindrical wall firmly joined together and a sealing chamber is located between said wall and shoulder and said wall is firmly yet releasably attached to the flexible conduit in a gasoline-tight manner, said sealing chamber having a distal narrow portion and a proximal enlarged portion of greater diameter than said distal portion, and, a rigid seal spacer arm of transverse cross-section diameter that is a minor portion of the diameter of the transverse cross section of said inlet tube of said distal seal actuating unit is firmly connected at its distal end to the interior surface of a proximal portion of said inlet tube and the proximal end of the rigid seal spacer arm is firmly yet releasably connected to a moveable seal having a maximum transverse diameter greater than the maximum transverse diameter of said distal sealing chamber portion and supports such seal at a position located within but spaced away from the interior surface of the walls of the enlarged portion of said sealing chamber, said seal being wider at its proximal end than its distal end and a resiliently deformable surface joins said ends thereof, and the intermediate connector tube extends distally of the proximal end of said inlet tube for the distal seal actuating unit for a distance greater than the distance at which said seal is held by said seal spacer arm to a position of said seal whereat the narrow distal chamber portion of said sealing chamber is engaged thereby, whereby the length of the seal spacer arm provides for movement of said seal into a locking relation with a portion of the wall of said sealing chamber prior to movement of the proximal edge of said inlet tube past the distal end of the intermediate connector.

2. Apparatus as in claim 1 wherein said proximal sealable unit of said automatic sealing unit is formed of material sufficiently soft at its surface to not create sparks on impact with concrete.

3. Apparatus as in claim 2 wherein the material from which said proximal sealable unit of said automatic sealing unit is formed is chosen from the group of materials composed of copper, aluminum and galvanized steel.

4. An automatic sealing unit comprising (a) a distal subassembly which in turn comprises a rigid cylindrical inlet tube for attachment to a nozzle assembly and (b) a proximal subassembly for attachment to the distal end of a conduit, and (c) one end of an intermediate connector tube forming a firm imperforate sleeve is attached with a gasoline-tight fit firmly to one end of the proximal subassembly and the other end of said connector tube is releasably attached to the proximal end of the distal subassembly with a gasoline-tight fit and means on said connector tube releasably yet firmly connect the distal subassembly to the proximal subassembly and (d) the proximal subassembly comprises a rigid cylindrical shoulder and a rigid hollow cylindrical wall firmly joined together and a sealing chamber formed between said wall and shoulder and said wall has firmly yet releasable gasoline-tight attachment for a flexible conduit, (e) said sealing chamber having a distal frustoconical relatively narrow portion and a proximal enlarged portion of greater diameter than said distal portion, and, (f) a rigid seal spacer arm of small transverse cross-section relative to the transverse cross section of said inlet tube of said distal subassembly is firmly connected at its distal end to the interior surface of a proximal portion of said inlet tube and the proximal end of the rigid seal spacer arm is firmly yet releasably connected to a moveable seal element having a maximum transverse diameter greater than a transverse diameter of said frustoconical chamber portion and supports such seal at a position located within but spaced away from the interior surface of the walls of the enlarged portion of said sealing chamber, said seal being wider at its proximal end than its distal end and a resiliently deformable surface joins said ends thereof, and (g) the intermediate connector tube extends distally of the proximal end of said inlet tube for the distal subassembly for a distance greater than the distance at which said seal element is held by said seal spacer arm to a position of said sealing element whereat the frustoconical distal chamber portion of said sealing chamber is engaged thereby, whereby the length of the seal spacer arm provides for movement of said seal into a locking relation with the frustoconical wall of said sealing chamber prior to movement of the proximal edge of said inlet tube past the distal end of the intermediate connector.

* * * * *